United States Patent
Tvirbutas

(10) Patent No.: US 7,595,483 B1
(45) Date of Patent: Sep. 29, 2009

(54) CALIBRATION METHOD FOR A STELLAR SENSOR

(75) Inventor: Andrew A. Tvirbutas, Newton, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/213,705

(22) Filed: Jun. 12, 2008

(51) Int. Cl.
*G01D 18/00* (2006.01)

(52) U.S. Cl. .................................... 250/252.1

(58) Field of Classification Search .............. 250/252.1, 250/203.1–203.7, 208.1
See application file for complete search history.

(56) References Cited

U.S. PATENT DOCUMENTS

| | | | | |
|---|---|---|---|---|
| 5,587,580 A | * | 12/1996 | Venier et al. | 250/206.1 |
| 5,731,851 A | * | 3/1998 | Jung | 348/699 |
| 5,917,494 A | * | 6/1999 | Arai et al. | 345/419 |
| 6,084,989 A | * | 7/2000 | Eppler | 382/293 |
| 2003/0189568 A1 | * | 10/2003 | Alkouh | 345/422 |
| 2004/0196451 A1 | * | 10/2004 | Aoyama | 356/139.03 |
| 2005/0084149 A1 | * | 4/2005 | Aizawa et al. | 382/154 |
| 2006/0146161 A1 | * | 7/2006 | Farrier | 348/308 |
| 2007/0038374 A1 | * | 2/2007 | Belenkii et al. | 701/222 |
| 2008/0001078 A1 | * | 1/2008 | Pittel et al. | 250/252.1 |

OTHER PUBLICATIONS

Burns et al., "Object location and centroiding techniques with CMOS active pixel sensors," 2003, IEEE Transactions on Electron Devices, vol. 50, No. 12, pp. 2369-2377.*

* cited by examiner

*Primary Examiner*—David P Porta
*Assistant Examiner*—Kiho Kim
(74) *Attorney, Agent, or Firm*—John Tarlano

(57) ABSTRACT

A method for determining a test star location in a field of view of the stellar sensor, by determining a test star location in a field of view of multiple stellar sensor patches. A narrow beam of light is shined onto pixels of a stellar sensor to obtain data of the response outputs of illuminated pixels and data of the non-response outputs from non-illuminated pixels. Data frames are formed from the data of response outputs and non-response outputs. A data point is formed from a data frame section of a data frame, data frame sections of the data frame producing data points. A data array is formed from the data points. Data patches are formed from the data array and processed.

4 Claims, 10 Drawing Sheets

1. * TEST PIXEL COORDINATES
2. ○ ASSUMED STAR CANDIDATE LOCATIONS AT FRAME 1
3. SIZE OF FRAME REQUIRED FOR A +1 PIXEL COARSE POSITIONING= 11x11
4. FOR ± 2 PIXEL COARSE POSITIONING A 13x13 PIXEL FRAME IS REQUIRED

1. * TEST PIXEL COORDINATES
2. O ASSUMED STAR CANDIDATE LOCATIONS AT FRAME 1
3. SIZE OF FRAME REQUIRED FOR A ±1 PIXEL COARSE POSITIONING= 11x11
4. FOR ±2 PIXEL COARSE POSITIONING A 13x13 PIXEL FRAME IS REQUIRED

Mk 6 SCAN

STAR VISITATION PATTERN
FOR ABOVE SCAN

SEQUENTIAL ALGORITHM EQUATIONS FOR CALIBRATION

- HYPERELLIPSE PRF MODEL $$h(xs, ys, x_k, y_k, i, j) = A_{ok} * \exp\left[-\left[\left(\frac{1}{r_{ok}}\right)^{2.5} * (|xvis_k + j|^{2.5} + |yvis_k + i|^{2.5})\right]\right]$$

WHERE $xvis_k, yvis_k$ : FRACTIONAL COORDINATES OF STAR CANDIDATE
$xvis_k = (xs + x_k) - \text{round}(x_s + x_k)$
$yvis_k = (ys + y_k) - \text{round}(y_s + y_k)$ $xs, ys$ : SCAN VECTOR $x_k, y_k$ : ESTIMATE OF STAR LOCATION FOR FRAME k $i, j$ : PIXEL IN 3 x 3 PATCH $A_{ok}, r_{ok}$ : ESTIMATES OF PRF MODEL PARAMETERS AT FRAME k

- HYPERELLIPSE LINEARIZED MODEL $$\Delta h = \frac{\partial h}{\partial x_k} * \Delta x = \frac{\partial h}{\partial y_k} * \Delta y = \frac{\partial h}{\partial r_{ok}} * \Delta r_0 + \frac{\partial h}{\partial A_{ok}} * \Delta A_{ok}$$

$\frac{\partial h}{\partial x_k}, \frac{\partial h}{\partial y_k}, \frac{\partial h}{\partial r_{ok}}, \frac{\partial h}{\partial A_{ok}}$ EVALUATED FOR VALUES OF xs, ys, xk, yk, i, j, $A_0$, $r_0$ WITH RESPECT TO CURRENT ESTIMATE $\Delta x, \Delta y$ : OFFSET OF STAR WITH RESPECT TO CURRENT ESTIMATE $\Delta h$ : DIFFERENCE BETWEEN PREDICTED AND ACTUAL MEASUREMENT

*FIG. 5*

SEQUENTIAL ALGORITHM EQUATIONS FOR CALIBRATION (CONT.)

$$\Delta h_k = z_k(i,j) = m(i,j)_k - h(i,j)_k$$

AND

WHERE $m(i,j)_k$ IS MEASUREMENT FROM FRAME k AT LOCATION CORRESPONDING TO THE EXPECTED STAR LOCATION $h(i,j)_k$ IS PREDICTED MEASUREMENT AT FRAME k BASED ON ESTIMATES OF x, y, $r_0$, AND $A_0$

FOR A 3 x 3 MEASUREMENT PATCH:

$$\bar{z}_k = \begin{bmatrix} m(1,1)_k - h(1,1)_k \\ m(1,2)_k - h(1,2)_k \\ m(1,3)_k - h(1,3)_k \\ m(2,1)_k - h(2,1)_k \\ \vdots \\ m(3,3)_k - h(3,3)_k \end{bmatrix} = \underbrace{\begin{bmatrix} \frac{\partial h}{\partial x_k}(1,1) & \frac{\partial h}{\partial y_k}(1,1) & \frac{\partial h}{\partial r_{ok}}(1,1) & \frac{\partial h}{\partial A_{ok}}(1,1) \\ \frac{\partial h}{\partial x_k}(1,2) & \frac{\partial h}{\partial y_k}(1,2) & \frac{\partial h}{\partial r_{ok}}(1,2) & \frac{\partial h}{\partial A_{ok}}(1,2) \\ \vdots & \vdots & \vdots & \vdots \\ \frac{\partial h}{\partial x_k}(3,3) & \frac{\partial h}{\partial y_k}(3,3) & \frac{\partial h}{\partial r_{ok}}(3,3) & \frac{\partial h}{\partial A_{ok}}(3,3) \end{bmatrix}}_{\text{MEASUREMENT MATRIX H}} \begin{bmatrix} \Delta x \\ \Delta y \\ \Delta r_0 \\ \Delta A_0 \end{bmatrix}$$

FIG. 7

SEQUENTIAL ALGORITHM EQUATIONS FOR CALIBRATION (CONT.)

- THE MEASUREMENT EQUATION IN VECTOR FORM $$\bar{z}_k = \bar{m}_k - \bar{h}_k = H * \bar{x} + \bar{n}$$

$$\bar{x} = \begin{bmatrix} \Delta x \\ \Delta y \\ \Delta r_0 \\ \Delta A_0 \end{bmatrix}$$

S THE STATE, $\bar{n}$ IS A 9 × 1 NOISE MEASUREMENT VECTOR

- GAINS AND COVARIANCE CAN NOW BE DEFINED

COVARIANCE: $P_k^{-1} = M_k^{-1} + H_k^T R^{-1} H_k$ $$K_k = P_k * H_k^T * R^{-1}$$

WHERE R IS A 9 × 9 DIAGONAL NOISE MATRIX AND $M_k = P_{k-1}$

- THE ESTIMATOR EQUATION:

$$\hat{x}_k = \tilde{x}_k + K_k * (Z_k - H_k * \tilde{x}_k)$$

FIG. 8

ACQUISITION MEASURE

- FOR EACH CANDIDATE COMPUTE ACQUISITION MEASURE EACH FRAME $$SCC(n, k) = SCC(n, k-1) + CC(n, k)$$

WHERE n, k ARE CANDIDATE NUMBER AND FRAME NUMBER

SCC(n, k) IS SUM OF CORRELATION COEFFICIENTS FOR CANDIDATE n $$CC(n,k) = \frac{\overline{m}'(n,k) * \overline{h}(n,k)}{\overline{h}'(n,k) * \overline{h}(n,k)}$$

WHERE $\overline{m}(n,k)$ AND $\overline{h}(n,k)$ ARE THE MEASUREMENT AND PREDICTED MEASUREMENT FOR CANDIDATE n AT FRAME k

- ACQUISITION MEASURE AT FRAME k FOR CANDIDATE n IS $$acq(n, k) = SCC(n,k)/k$$

*FIG. 9*

COMPUTE CALIBRATION PARAMETERS

- THE PRF CALIBRATION PARAMETERS ARE DEFINED AS p0, g0, & r0. p0 & g0 ARE COMPUTED ON BASIS OF THE ESTIMATES a0 & r0 OBTAINED FROM THE PRF CALIBRATION PROCESS AND THE HYPER ELLIPTIC MODEL OF THE PRF $$PRF(x_i, x_{oc}, y_i, y_{oc}) = a0 \exp(|x_i - x_{oc}|^{2.5} + |y_i - y_{oc}|^{2.5}) / r0^{2.5}$$

WHERE PRF REPRESENTS THE STAR ENERGY DISTRIBUTION IN A CCD ARRAY, $x_{oc}, y_{oc}$ IS THE STAR LOCATION, $x_i, y_i$ THE DESIRED PIXEL. FOR COMPUTING p0 & g0, $x_{oc} = y_{oc} = 0$ $$p0 = \frac{a0}{\sum_{-1}^{+1}\sum_{-1}^{+1} PRF(x_i, y_i)}$$

$$g0 = \frac{\sum_{-1}^{+1}\sum_{-1}^{+1} PRF(x_i, y_i)}{H_x * t_i}$$

WHERE $H_x$ IS THE SPECTRAL IRRADIANCE OF BAND AND $t_i$ IS THE INTEGRATE TIME

FIG. 10

CALIBRATION METHOD FOR A STELLAR SENSOR

In the past, it was required that light from a test star be very accurately and stably shone onto a test pixel of a stellar sensor, in order to calibrate the test pixel. Seventeen positions of light from a test star were shone on the test pixel, in order to determine a gain of the test pixel, and shape and relative height of a test star in the test pixel of the stellar sensor.

In the present method for determining gain of a test pixel and shape and relative height of a test star in or near to the test pixel, light from a stationary test star is shined onto a stellar sensor, at or near the test pixel. Data from sixty different 11×11 sets of pixels of the stellar sensor is obtained as the test star is scanned in the vicinity of the test pixel, producing sixty frames of data from the stellar sensor. Sixty test star sightings are made by the stellar sensor, produced the sixty frames of data. A 5×5 data array is made from each frame of data. Each 5×5 data array corresponds to a pixel of the stellar sensor. Nine 3×3 data patches are taken from each 5×5 data array. The nine data 3×3 patches are processed to find the location of the test star in the stellar sensor's field of view.

Sixty sightings are used, each sighting producing a 11×11 frame of data from the stellar sensor. Sixty different pixel sets of a stellar sensor take sixty different views of a light spot of a test star, in order to produce the sixty data frames.

An adaptive optimal estimator is applied to the nine 3×3 patches of each frame of data in order to determine a test star location, by row and column in the stellar sensor, and pixel response function (PRF) parameters. The PRF parameters characterize the spread of star energy over a region of the stellar sensor detector as effected both by the stellar sensor optics and the stellar sensor detector when a narrow beam of light is shone on the stellar sensor. The PRF parameters are gain of a pixel, and, shape and relative height of the test star. The star candidate (one of nine), and associated pixel, providing the highest acquisition number, provides the location of the test star in the field of view of the stellar sensor.

SUMMARY OF THE INVENTION

A method for determining test star location in a field of view of stellar sensor comprising shining a narrow beam of light onto pixels of a stellar sensor to produce a response output from each illuminated pixel, and a non-response output from each non-illuminated pixel, the illuminated pixels including an illuminated test pixel, obtaining data of the response outputs of illuminated pixels and data of the non-response outputs from non-illuminated pixels, forming data frames from the data of response outputs and non-response outputs, data of the response output of the illuminated test pixel being in all of the data frame sections, forming a data point from a data frame section of a data frame, data frame sections of the data frame producing data points, forming a data array from the data points, forming data patches from the data array, and processing the data patches to determine a test star location in a field of view of the stellar sensor.

DESCRIPTION OF THE DRAWING

FIG. 5 shows sequential algorithm equations for use in stellar sensor calibration.

FIG. 7 shows further sequential algorithm equations for use in stellar sensor calibration, continuing from FIG. 5.

FIG. 8 shows further sequential algorithm equations for use in stellar sensor calibration, continuing from FIG. 7.

FIG. 9 shows test star acquisition measure equations.

FIG. 10 shows equations for computation of PRF calibration parameters.

DESCRIPTION OF THE PREFERRED EMBODIMENT

In order for a star detector, i.e. stellar sensor, to be able to exactly detect where a star is located in the star detector's field of view, test star pixels in the star detector are calibrated. Light from a test star is shone on the star detector, at or very near to a selected test pixel of the star detector. Test star pixels in a 3×3 pixel array, that includes the test pixel, are calibrated so that these test star pixels will properly sense the position of light from a real star.

Figure 2:
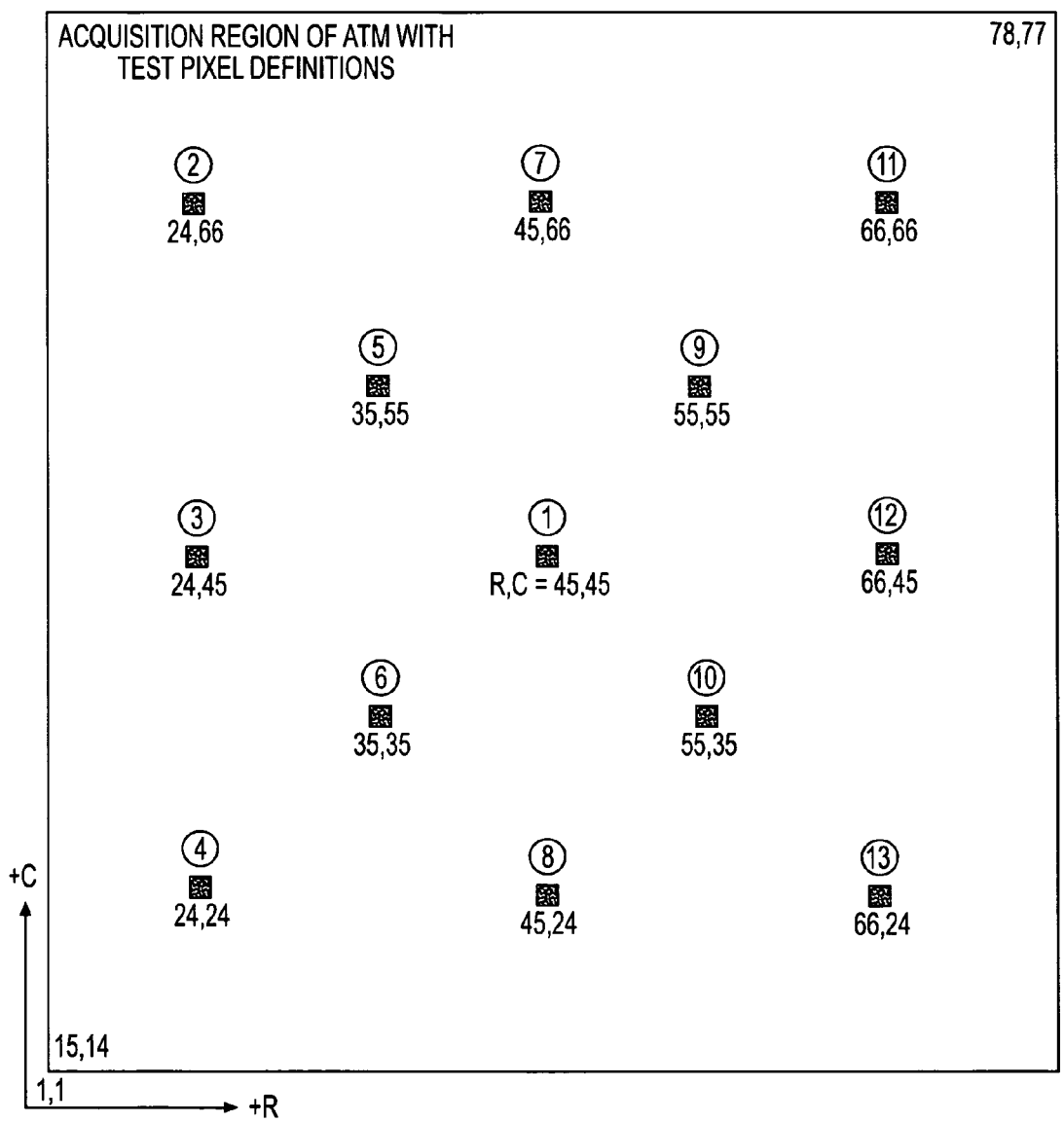
FIG. 2 is a diagram of test pixel locations on a stellar sensor.

The star detector has N×N pixels. Thirteen pixels are successively selected from the detector as test pixels. The thirteen test pixels are shown in FIG. 2. Sixty 11×11 pixel frames are selected from the star detector, as the test star is scanned across the detector in a precisely known up and down and side to side pattern. Each of the sixty frames selected from the N×N star detector is selected such that a test pixel is located in the center of each one of sixty 11×11 frames. The data from sixty different 11×11 pixel frames, i.e. pixel arrays, that include the test pixel, is initially collected during the calibration process. The test star pixels are located near to, or include, the test pixel.

In order to calibrate test star pixels, near the test pixel, a test star is positioned in the N×N array at or near the test pixel. Star sensing data from each of sixty 11×11 pixel frames or groups, that include the test pixel, is collected. The pixel sensing data is used during the disclosed method to calibrate the test star pixels. Each of the sixty 11×11 pixel frames for the test pixel contains 121 pixels.

Figure 1:
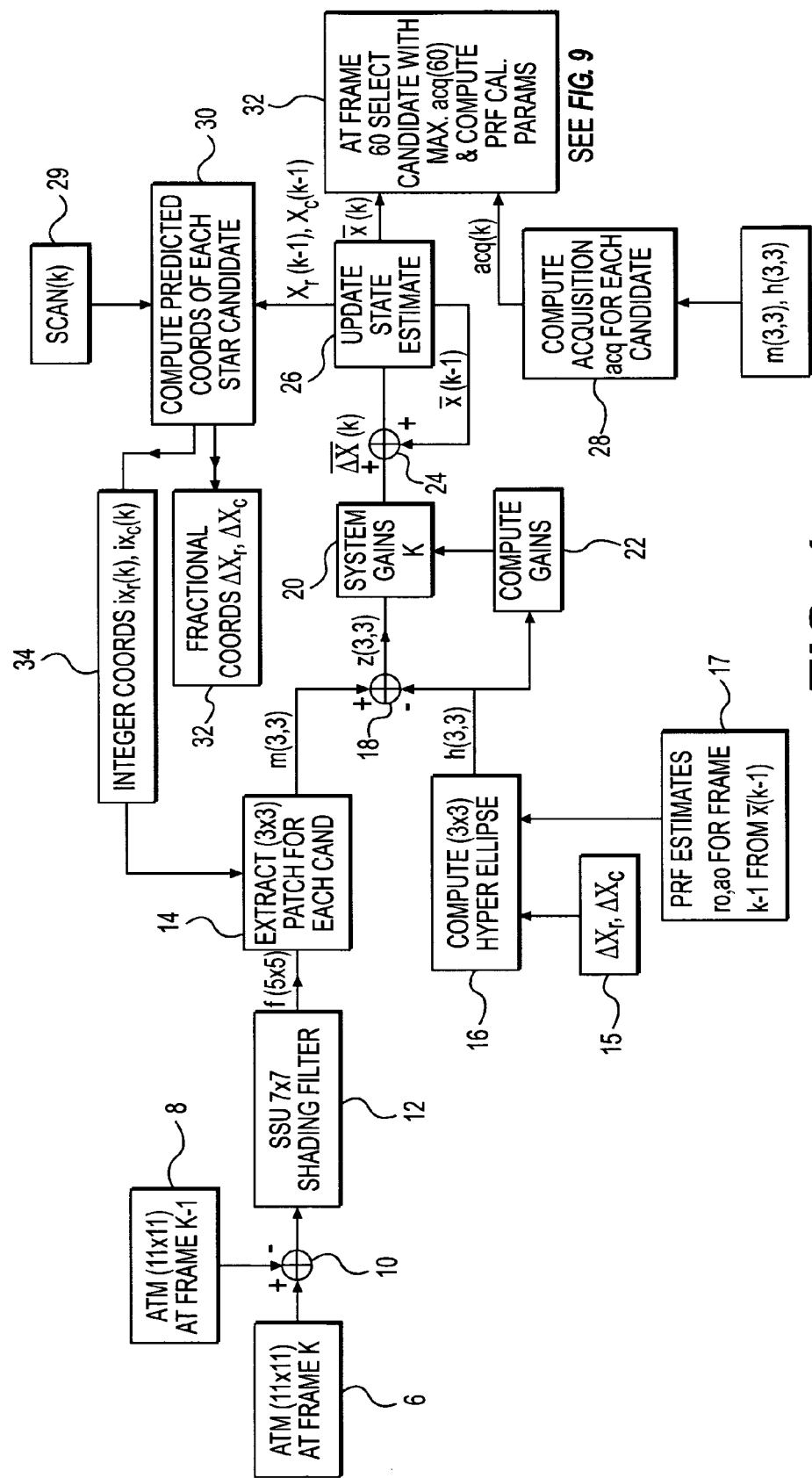
FIG. 1 is a flow diagram of a calibration system for a stellar sensor.

The star data, that is, the output from these sixty pixel frames, is used in the disclosed method, shown in the diagram of FIG. 1. A 7×7 data filter is scanned over each 11×11 data frame, to form twenty five data points. A 5×5 data array is formed from the twenty five data points. Data from nine different 3×3 patches, taken from a 5×5 data array, formed from the 7×7 filtered sections of a frame, is obtained. The 3×3 patches are analyzed to find a test star pixel that contains the test star, and the location of the test star within that pixel.

In FIG. 1 star data from the 11×11 pixel frames, that include the first test pixel, is successively selected. The coarsely positioned star is at or near the first test pixel. A first 11×11 array of pixels, that includes the first test pixel, is designated as frame 1. Star data from each of the 121 pixels of frame 1 is collected. This data is referred to as frame 1 data.

It is assumed that a test star is located at or very near to the first test pixel. The data from the output of each of the 121 pixels of frame 1 is sent through a 7×7 shading filter. The 7×7 shading filter process data from a first 7×7 sub-frame of the frame. The process is repeated by forming a different 7×7 sub-frame of the 11×11 pixels of frame 1. The process is repeated 24 more times. The shading filter removes a D.C. and shading components from data collected by each pixel in twenty five sub-frames of the 11×11 pixel array of frame 1. The shading filter produces a 5×5 set of data points from the 25 scans of frame 1 data by the 7×7 shading filter.

There are nine 3×3 sets of data in a 5×5 set of data. Each 3×3 set of data is called a patch. A first 3×3 set of data is processed. A device called a data extractor extracts data of a first three-by-three set of data from the 5×5 set of data.

Again, the shading filter filters out data from a 7×7 array of pixels of frame 1, so that a data of a 5×5 set of data is produced. In other words the shading filter will select data from 7×7 sections of the 11×11 array of pixels of frame 1. Data in a 5×5 set of data comes out of the shading filter. The 5×5 set of data is sent into a device to extract a first three-by-three set of data from the 5×5 set of data. The first 3×3 set of data is called a first patch.

Figure 3:
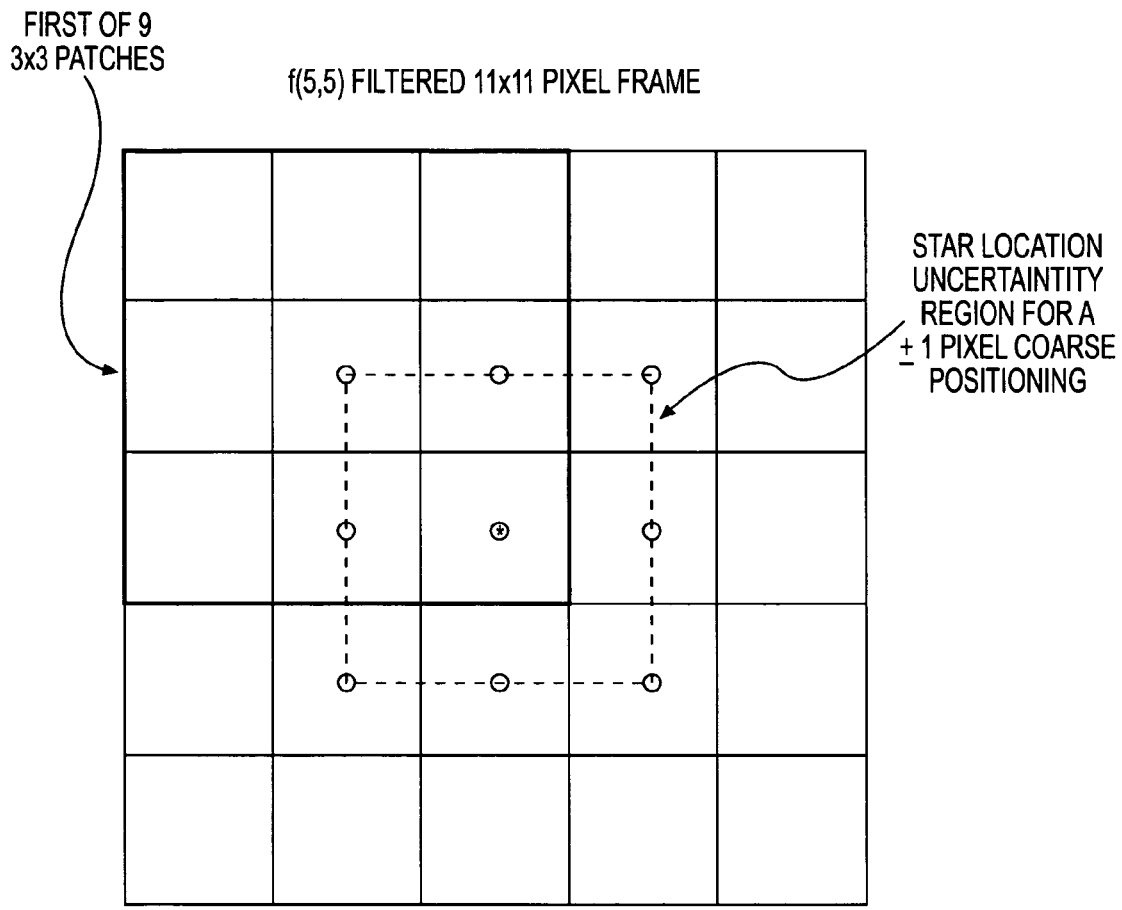
FIG. 3 is a diagram of a 5×5 data array of filtered data, the data array obtained after filtering an 11×11 frame of data with a 7×7 filter.

A first patch is shown in FIG. 3. The first patch is in the upper left corner of the 5×5 set of data. The first patch is a 3×3 set of data, shown in FIG. 3. It is assumed that the test star is located at or near pixels associated with the center of the data of the first patch.

Nine pieces of data are in a first patch shown in FIG. 3. The nine pieces of data are related to nine scans of pixel data of the 11×11 array by the shading filter. These nine pieces of data are sent to an adder. A computed 3×3 set of data, from a hyperellipse device, is also sent to the adder. The hyperellipse equation is shown in FIG. 5. The 3×3 hyperellipse set of data represents the expected signal from the test star and is dependent on the expected initial location of the test star and the initially expected calibration parameters a0 and r0. It is assumed, for frame 1, that the test star in the first patch is at or near the center pixel of pixel frame 1.

At frame 1 the values Δxr and Δxc (see FIG. 6) are equal to the fractional portion of the scan vector row and column dimensions. These values occur since it is assumed that the test star is in the center of the pixel prior to the frame 1 scan. Nine pieces of data are sent out of hyperellipse device.

The hyperellipse data, which is h(3×3), is sent to the adder. The adder produces a data set called z(3,3). The adder data set is nine pieces of data. The adder data set is the patch 1 data minus the hyperellipse data.

Pixel gains data, that previously had been computed for the pixel array, is applied to the three-by-three pieces of adder data z(3,3), that is, the nine pieces of data from the adder. Computed gains data was previously computed in a test set computer. The gains data is applied to the adder data in a system gain device. The gain data equations are shown in FIG. 8.

A 4 value vector Δx(k) comes out of the systems gains device. This vector is used by a state estimator device. The state estimator device sends out a 4 value vector x(k) to a first computer device. The state estimator device also sends values xr(k−1) and xc(k−1) to a second computer device. The second computer device computes predicted coordinates of the coarsely positioned star to be used for processing the next frame of data.

Further, an acq(k) value is sent from an acquisition device to the first computer device. Acq(k) represents how closely the patch 1 data matches the computed data from the hyperellipse. Values near 1 are indicative of a close match. The first computer device produces two numbers r0 and a0 after 60 pixel frames have been processed by the system of FIG. 1. r0 and a0 are used to calibrate the nine pixels of the N×N pixel array that are part of the 3×3 first test array that includes the first test star.

The second computer device produces Δxr fraction and Δxc fraction. Δxr fraction and Δxc fraction are values that are used to determine the location of the test star that within the center pixel of the 3×3 pixel array that contains the first test pixel. Again, the first pixel array contains the first test pixel plus eight pixels that are in a square around the first test pixel.

In FIG. 1, atm (add to memory) is an array in a stellar computer memory consisting of the summation of the detector output frame data that is shifted, prior to addition, to compensate for platform (star) scan. This scheme was developed to reduce detector noise and facilitate accurate star location.

atm(11×11) is an 11×11 data patch (array). atm(11×11) is extracted from a memory, called atm (add to memory). There is atm(11×11) for each test star pixel. For example for test pixel 2 an 11×11 atm data frame, centered at pixel 24,66 of the atm, is extracted. The atm's pixel array is shown in FIG. 2. The 11×11 dimension of the data frame is selected to allow for a ±1 pixel test star positioning uncertainty. The size of the data frame can be increased to allow for a greater uncertainty.

For processing of a data frame 2, and data frames greater than data frame 2, it is necessary to subtract two subsequent atm(11×11) data frames, since this calibration approach requires the use of single frame data. For example, for frame 2 processing for test pixel 2, an 11×11 pixel data frame of atm at frame 2, centered at 25,66, is subtracted from a corresponding 11×11 data patch of atm of frame 1. The input to the shading filter is therefore an 11×11 frame of frame 2 data for test pixel 2.

A 7×7 shading filter is a 7×7 array that was presently designed. It is used to remove the detector DC background and shading. The shading filter is overlaid over the 11×11 patch at a location such that the filter boundary is within the 11×11 patch. For example the first location of the shading filter would be over the top left hand corner of the 11×11 data frame. The corresponding values of the shading filter and the frame are multiplied and summed. The resulting sum represents the filtered pixel corresponding to the center of the 7×7 array. This process is repeated by shifting the shading filter over the 11×11 frame one pixel at a time. The resultant filtered region of the 11×11 frame is a 5×5 array of data called f(5,5).

A (3×3) patch is extracted for each star candidate, as shown in FIG. 3. Initially (prior to scanning) the test star candidate is assumed to be centered in a pixel for each of the 9 patches. After the frame 1 scan the candidate shifts by the fractional portion of the scan but is still contained in the center pixel of the (3×3) patch. Therefore for star candidate 1, the top left 3×3 patch, called m(3,3), is extracted for initial processing. m(3,3) is sufficiently large to contain most of the star signal. For frames greater than 1, the estimated integer star candidate coordinates (ixr(k), ixc(k)) can shift to new locations in f(5, 5).

The 3×3 hyperellipse array h(3,3) is computed from equations shown in FIG. 5. The hyperellipse is a bell shaped function. The hyperellipse equation closely approximates the star signal distribution in a 3×3 pixel array area, as a function of the star location within the central pixel of the 3×3 pixel array. The input parameters required to compute the function include the current estimates of the calibration parameters r0 and a0 and the current estimate of the star's sub-pixel location Δxr, Δxc referenced to the center of a pixel, where r and c refer to row and column. Δxr and Δxc are therefore always between the values of ±0.5.

Figure 6:
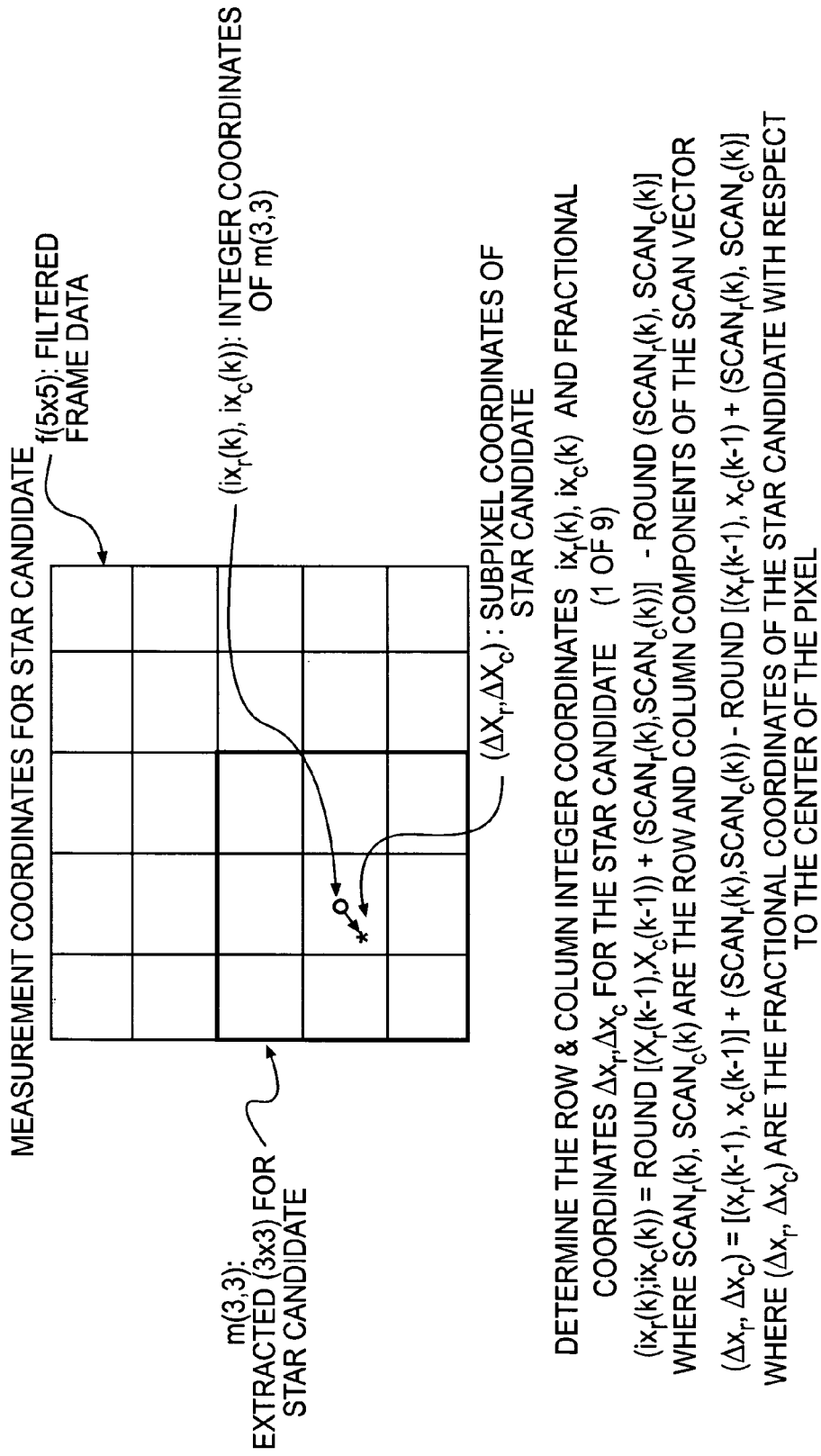
FIG. 6 shows a 3×3 patch of data taken from the 5×5 data array of FIG. 3.

Initially the calibration parameters are assumed to be nominal system values and the star location is assumed centered in the pixel. After the frame 1 scan the star location shifts with respect to the assumed centered star location prior to the scan by the fractional portion of the scan vector. Therefore the input values of Δxr, Δxc for frame 1 processing are equal to the fractional portion of the frame 1 scan vector. FIG. 6 shows equations for determining Δxr and Δxc.

The predicted coordinates of each star candidate, after the scan, are computed. This consists of determining the integer row and column coordinates ixr(k), ixc(k) required to extract m(3,3), and Δxr, Δxc, the sub-pixel coordinates required to determine the predicted star signal distribution h(3,3) based on the current estimates of r0,a0. This computation is based on the star coordinate estimate xr(k−1), xc(k−1) from the last frame k−1 and the scan vector.

Figure 4A:
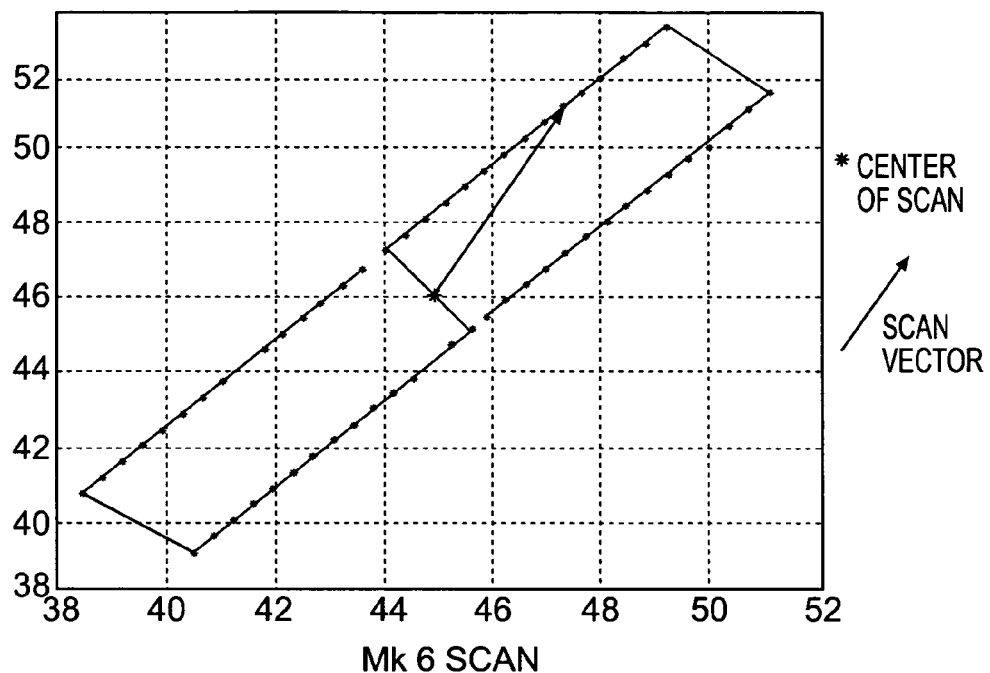
FIG. 4A is a scan pattern for a test scan.
Figure 4B:
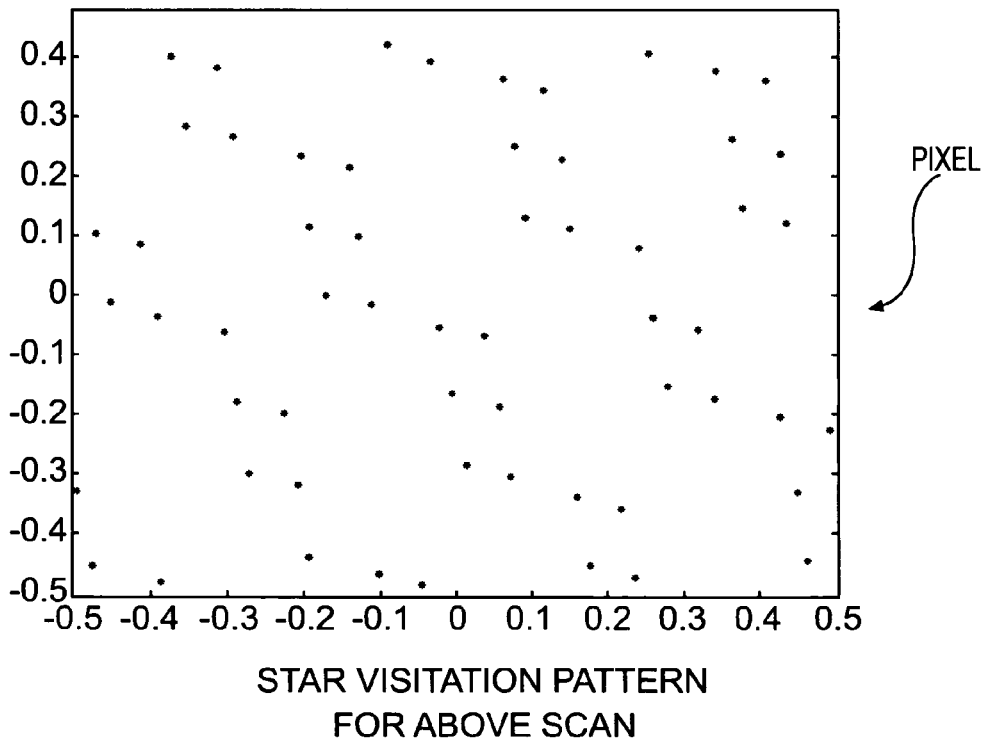
FIG. 4B is pixel star visitation pattern for the scan pattern of FIG. 4A.

The scan vector is the vector from the center of the scan pattern to a point corresponding to frame k, as shown in FIG. 4A. The visitation pattern, which indicates the location of the star within a pixel corresponding to each scan vector, is shown in FIG. 4B. The scan vector represents the translation of the test star from its initial, estimated, location in the detector array. Since it is possible that the estimated integer values ixr(k), ixc(k) will require a 3×3 patch that is not fully contained within f(5,5), the pixels falling outside f(5,5) are set to zero. If the central pixel of m(3,3) falls outside the f(5,5) it is shifted to bring it inside the f(5,5).

Gains K are computed. The gains are determined on the basis of linear estimation theory. This theory was developed in the past and is frequently applied to determine the parameters of linear systems where measurements are available that relate to the parameters. Since in this case the system is non-linear, a linearization is carried out, a standard procedure when the approximate initial values for the parameters are available. The hyperellipse at frame k is linearized with respect to the estimate of the sub-pixel star location and the calibration parameters r0, a0 at frame k.

The state estimate Δx(k) is computed. The state estimate is a 4 element vector consisting of the star coordinates and r0,a0. The nine values of the 3×3 array z(3,3), called the measurement, and equal to the difference between m(3,3) and h(3,3), the predicted star signal, are multiplied by the 4×9 gain matrix K. This determines an incremental change to the calibration parameters r0, a0 and star location estimates as obtained from processing the measurement z(3,3) from the previous frame. FIGS. 5, 6 and 7 show equations for linearization and gain computations.

The state estimate is updated. Values of the calibration parameters r0, a0 and the star centroid described by the four value vector x(k−1) as determined after frame k−1 processing are updated by adding the corresponding incremental values, see step above, to determine the estimate of the parameters at frame k.

Acquisition (acq) is computed for each candidate: For each of the nine star candidates, a coefficient CC(n,k) is determined, that indicates how closely m(3,3), representing the star candidate signal distribution, and h(3,3), representing the predicted star signal distribution, are matched. A running sum SCC(n,k) of the coefficients is computed using equations of FIG. 9. Acquisition (acq) is the sum SCC(n,k) divided by the current frame count k. The value acq indicates how closely the measured star energy distribution for a star candidate matches the predicted star energy distribution based on the estimated calibration parameters r0, a0. After the completion of processing for 60 frames, calibration parameters r0, a0 are selected for the candidate, from 9 candidates, that has the largest score.

At frame 60 the PRF calibration parameters are computed. The star candidate with the largest acq score is selected. The corresponding values r0, a0 are the basis for calibration for test pixel 24,66 assumed in this example. The equations in FIG. 10 are used to derive the two additional calibration parameters p0 and g0 required to complete the triplet (r0, p0, g0). a0 is an interim value that is not required for the final calibration.

While the present invention has been disclosed in connection with the preferred embodiment thereof, it should be understood that there are other embodiments which fall within the spirit and scope of the invention as defined by the following claims.

What is claimed is:

1. A method for determining test star location in a field of view of stellar sensor, comprising:
   (a) shining a narrow beam of light onto pixels of a stellar sensor to produce a response output from each illuminated pixel, and a non-response output from each non-illuminated pixel, the illuminated pixels including an illuminated test pixel;
   (b) obtaining data of the response outputs of illuminated pixels and data of the non-response outputs from non-illuminated pixels;
   (c) forming data frames from the data of response outputs and non-response outputs, data of the response output of the illuminated test pixel being in all of the data frame sections;
   (d) forming a data point from a data frame section of a data frame, data frame sections of the data frame producing data points;
   (e) forming a data array from the data points;
   (f) forming data patches from the data array; and
   (g) processing the data patches to determine a test star location in a field of view of the stellar sensor.

2. A method for calibrating a stellar sensor, comprising:
   (a) shining a narrow beam of light onto pixels of a stellar sensor to produce a response output from each illuminated pixel, and a non-response output from each non-illuminated pixel, the illuminated pixels including an illuminated test pixel;
   (b) obtaining data of the response outputs of illuminated pixels and data of the non-response outputs from non-illuminated pixels;
   (c) forming data frames from the data of response outputs and non-response outputs, data of the response output of the illuminated test pixel being in all of the data frame sections;
   (d) forming a data point from a data frame section of a data frame, data frame sections of the data frame producing data points;
   (e) forming a data array from the data points;
   (f) forming data patches from the data array;
   (g) adding data in the data patches with data in a hyperellipse data matrix, the addition producing adder results; and
   (h) applying gain data to the adder results to produce a pixel location of the narrow beam of light in the field of view of the stellar sensor.

3. A method for calibrating a stellar sensor, comprising:
   (a) shining a narrow beam of light onto pixels of a stellar sensor to produce a response output from each illuminated pixel, and a non-response output from each non-illuminated pixel, the illuminated pixels including an illuminated test pixel;
   (b) obtaining data of the response outputs of illuminated pixels and data of the non-response outputs from non-illuminated pixels;
   (c) forming data frames from the data of response outputs and non-response outputs, data of the response output of the illuminated test pixel being in all of the data frame sections;

(d) forming a data point from a data frame section of a data frame, data frame sections of the data frame producing data points;
(e) forming a data array from the data points;
(f) forming data patches from the data array;
(g) adding data in the data patches with data in a hyperellipse data matrix, the addition producing adder results;
(h) applying gain data to the adder results to produce a pixel location of the narrow beam of light in the field of view of the stellar sensor for each data frame section;
(i) determining acquisition numbers for the pixel locations; and
(j) selecting a pixel location having the highest acquisition number.

4. A method for calibrating a stellar sensor, comprising:
(a) shining a narrow beam of light onto pixels of a stellar sensor to produce a response output from each illuminated pixel, and a non-response output from each non-illuminated pixel, the illuminated pixels including an illuminated test pixel;
(b) obtaining data of the response outputs of illuminated pixels and data of the non-response outputs from non-illuminated pixels;
(c) forming data frames from the data of response outputs and non-response outputs, data of the response output of the illuminated test pixel being in all of the data frame sections;
(d) forming a data point from a data frame section of a data frame, data frame sections of the data frame producing data points;
(e) forming a data array from the data points;
(f) forming data patches from the data array;
(g) adding data in the data patches with data in a hyperellipse data matrix, the addition producing adder results;
(h) applying gain data to the adder results to produce PRF calibration parameters for a selected pixel in each frame section; and
(i) choosing a selected pixel having the highest acquisition number as the location of the narrow beam of light on the stellar sensor.

* * * * *